(12) United States Patent
Lanard et al.

(10) Patent No.: US 9,016,770 B2
(45) Date of Patent: Apr. 28, 2015

(54) ASSEMBLY COMPRISING A MOTOR VEHICLE FRONT SURFACE FRAME ELEMENT AND A BRACKET INTENDED TO SUPPORT AN ACTUATOR

(75) Inventors: Jean-Louis Lanard, Feucherolles (FR); Julien Plenchette, Livonia, MI (US); Frederice Vacca, Behoust (FR); Mark Williams, Brighton, MI (US)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 14/122,294

(22) PCT Filed: May 22, 2012

(86) PCT No.: PCT/EP2012/059506
§ 371 (c)(1),
(2), (4) Date: May 8, 2014

(87) PCT Pub. No.: WO2012/160065
PCT Pub. Date: Nov. 29, 2012

(65) Prior Publication Data
US 2014/0232145 A1    Aug. 21, 2014

(30) Foreign Application Priority Data
May 26, 2011   (FR) ...................................... 11 54581

(51) Int. Cl.
*B60N 99/00* (2006.01)
*B62D 25/08* (2006.01)
*B60K 11/08* (2006.01)

(52) U.S. Cl.
CPC .............. *B62D 25/08* (2013.01); *B60K 11/085* (2013.01)

(58) Field of Classification Search
CPC .............................. B62D 25/08; B60K 11/085
USPC ........................................ 296/193.09, 203.02
See application file for complete search history.

(56) References Cited

U.S. PATENT DOCUMENTS

| 2008/0217961 A1* | 9/2008 | Lustiger et al. | 296/193.09 |
| 2009/0256389 A1* | 10/2009 | Kosaka | 296/187.09 |
| 2010/0282438 A1 | 11/2010 | Wirth et al. | |

FOREIGN PATENT DOCUMENTS

| DE | 202011000392 U1 | 5/2011 |
| DE | 102010002373 A1 | 9/2011 |
| EP | 0925983 A1 | 6/1999 |
| EP | 2233343 A2 | 9/2010 |
| EP | 2407333 A1 | 1/2012 |
| FR | 2945242 A1 | 11/2010 |

OTHER PUBLICATIONS

English language abstract and machine translation for DE 202011000392 extracted from espacenet.com database on May 29, 2014, 35 pages.

(Continued)

*Primary Examiner* — Lori L Lyjak
(74) *Attorney, Agent, or Firm* — Howard & Howard Attorneys PLLC

(57) ABSTRACT

An assembly comprises a framework, which is intended to be located on the front face of a motor vehicle, and a bracket. The assembly includes a device for positioning the bracket on the framework and the bracket includes a securing device for supporting an actuator that is capable of driving one or more members to be mounted onto the framework.

12 Claims, 1 Drawing Sheet

(56) References Cited

OTHER PUBLICATIONS

English language abstract and machine translation for DE 102010002373 extracted from espacenet.com database on May 29, 2014, 40 pages.

English language abstract and machine translation for EP 0925983 extracted from espacenet.com database on May 29, 2014, 29 pages.

English language abstract for FR 2945242 extracted from espacenet.com database on May 26, 2014, 25 pages. Also see English equivalent US 2010/0282438.

International Search Report for PCT/EP2012/059506 dated Aug. 16, 2012, 7 pages.

* cited by examiner

US 9,016,770 B2

ASSEMBLY COMPRISING A MOTOR VEHICLE FRONT SURFACE FRAME ELEMENT AND A BRACKET INTENDED TO SUPPORT AN ACTUATOR

RELATED APPLICATIONS

This application is the National Stage of International Patent Application No. PCT/EP2012/059506, filed on May 22, 2012, which claims priority to and all the advantages of French Patent Application No. FR 11/54581, filed on May 26, 2011, the content of which is incorporated herein by reference.

The invention relates to an assembly of a framework designed for the front face of a motor vehicle and a bracket designed to hold an actuator able to drive one or more members to be mounted on said framework. The invention also relates to a framework of such an assembly and a bracket of such an assembly.

The invention applies in particular to all types of front faces and/or fan units. In this field, it is known to actuate members mounted on the framework, in particular ventilation flaps, using an actuator connected directly to the framework.

There are numerous actuator technologies, such as actuators that use direct-current motors or step motors.

Furthermore, each technology offers different characteristics in terms of structure, dimensions, mass and even anchoring interfaces.

To enable the framework to receive the actuator, the framework must be modified for each new actuator. The framework is a large and expensive part that fulfils a number of functions other than holding the ventilation flap actuator. As a result, it is not very advantageous, from an industrial point of view, to change the framework structure each time the actuator type is changed.

The invention is intended to overcome the aforementioned problem.

For this purpose, it proposes an assembly of a framework, designed for the front face of a motor vehicle, and a bracket, in which said assembly includes means for positioning the bracket on the framework and in which said bracket includes rigid-attachment means intended to hold an actuator able to drive one or more members to be mounted on said framework.

The member or members to be mounted on said framework are, in particular, ventilation flaps enabling or preventing the passage of an external airflow through the front face of the vehicle.

Thus, the invention enables the same framework to be used, regardless of the type of actuator selected.

According to one aspect of the invention, the positioning means include pre-positioning means and attachment means. The bracket can then be put in place on the housing using the pre-positioning means and held thereon by the attachment means.

According to an example embodiment of the invention, the pre-positioning means include at least one rib and at least one slot. The rib or ribs and the slot or slots are in this case complementary, i.e. the rib or ribs penetrate the slot or slots to ensure the pre-positioning of the bracket on the framework. Advantageously, the rib or ribs are located on the bracket and the slot or slots are located on the framework.

According to one aspect of the invention, the attachment means include a pin and an eyelet, placed opposite one another, one being located on the bracket and the other on the framework, said pin and said eyelet being able to receive an attachment element. The pin and the eyelet are in contact with one another and the bracket is attached to the framework using an attachment element received by the pin and the eyelet, in particular a screw. Advantageously, the pin is located on the framework and the eyelet is located on the bracket.

According to an example embodiment, said framework includes an arm with a "U"-shaped body, said slots being located on a wall of the body, the pin originating from a central branch of the body.

According to one aspect of the invention, the bracket includes a first face having a receiving zone for the actuator.

According to another aspect of the invention, the assembly includes an eyelet for positioning the bracket on the framework, the eyelet originating from the first face of the bracket in an attachment zone different from the receiving zone for the actuator and the eyelet projecting beyond the first face of the bracket. This may be the eyelet included in the attachment means of the assembly.

According to an example embodiment, the rigid-attachment means of the bracket include at least one lug and at least one peg, the lug or lugs and the peg or pegs projecting from the first face of the bracket, specifically the receiving zone for the actuator. The lug or lugs can then penetrate the holes in the actuator, while the pegs can keep the actuator pressed against the receiving zone.

According to one aspect of the invention, the assembly includes ribs for positioning the bracket on the framework, the bracket having a second face opposite the first face, and the rib or ribs originating from the second face and projecting therefrom. These may be the rib or ribs included in the pre-positioning means of the assembly.

According to another aspect of the invention, the bracket has at least two anchoring points on the framework, located on either side of the receiving zone for the actuator. These two anchoring points are thus located in a plane perpendicular to the receiving zone, i.e. in a plane perpendicular to the plane in which the first face extends, thereby preventing the bracket from being cantilevered on the framework.

According to an example embodiment, the actuator is part of the assembly according to the invention.

The invention also relates to a framework of an assembly as described above and a bracket of an assembly as described above.

The attached figures help to understand how the invention can be carried out. In these figures, identical reference signs refer to similar elements.

The invention is used, for example, in a front face of a motor vehicle and/or in a fan unit of a motor vehicle.

Figure 1:
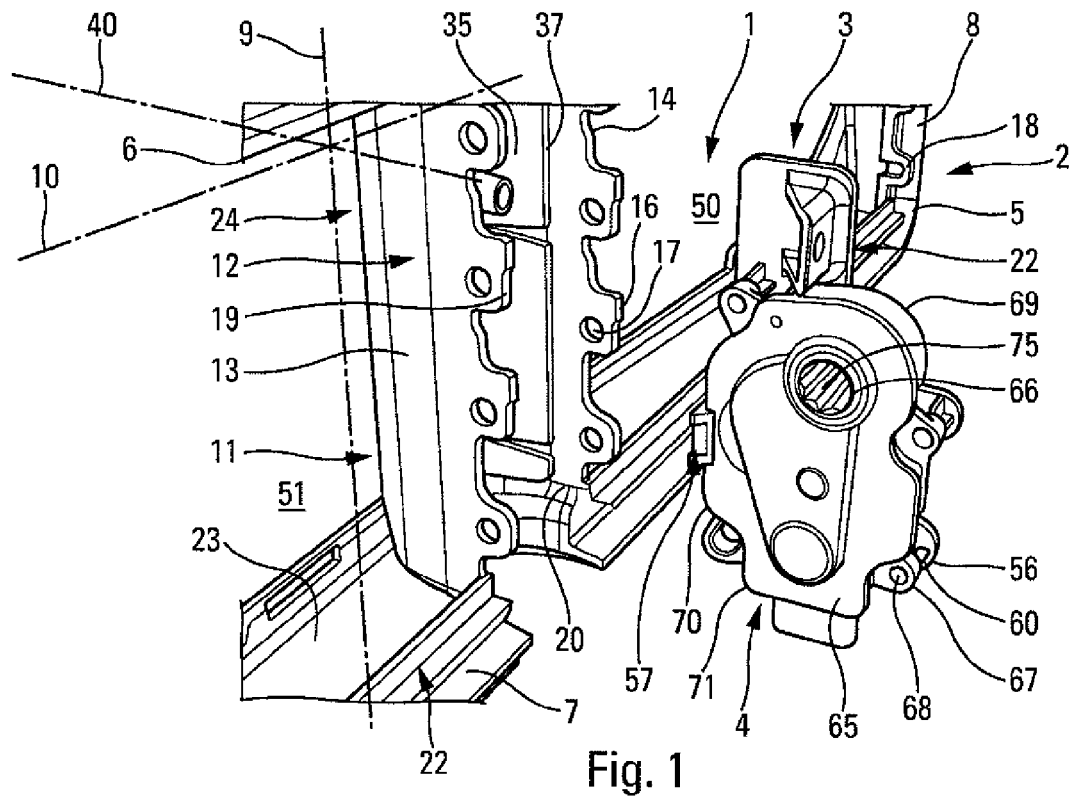
FIG. 1 is a partial perspective exploded view of an example assembly according to the invention, including a framework, a bracket and an actuator, the actuator being mounted on the bracket.

An assembly 1 according to the invention is shown in part, in perspective and exploded in FIG. 1. Such an assembly 1 includes a motor-vehicle front-face framework 2 and a bracket 3 for an actuator 4 that is able to drive one or more members (not shown) to be mounted on the framework 2, in particular ventilation flaps.

Said framework 2 may be designed to be mounted, pre-fitted with said bracket 3, said actuator 4 and said members driven by said actuator 4, along with any other members, on a chassis of the vehicle.

The framework 2 in particular includes a rectangular frame 5, i.e. the framework 2 includes an upper side 6, a lower side 7, a right side 8 and a left side (not shown) linked together to form a rectangle. In FIG. 1, the upper side 6 is located above and parallel to the lower side 7, the right side 8 being located on the right-hand side of the figure in parallel to the left side, which is not shown.

The framework 2 also includes an arm 11 with a "U"-shaped body 24. The body 24 thus comprises three branches forming a base and two flanges, linking the upper side 6 and the lower side 7 of the framework. The arm 11 therefore has a "U" section in a plane perpendicular to a lateral axis 9 prolonging the arm 11. The three branches include a first side branch 13, a second side branch 14 and a central branch (reference sign 15 in FIG. 2) linking the first side branch 13 to the second side branch 14. The first and second side branches 13, 14 extend in planes perpendicular to a longitudinal axis 10 extending the upper and lower sides 6, 7 of the frame, the first side branch 13 facing the left side of the framework, the second side branch 14 facing the right side 8 of the framework.

The arm 11 may be located in a central zone of the framework 2. The arm 11 thus separates the frame 5 into two windows, a right window 50 located between the second side branch 14 of the arm 11 and the right side 8 and a left window 51 located between the first side branch 13 of the arm 11 and the left side of the framework 2. It may more specifically link the middles of the upper side 6 and the lower side 7 of the framework 2.

The distal extremities 19 of the first side branch 13 and the second side branch 14 are the extremities of the "U" shape of the body 24 of the arm 11 in a plane perpendicular to the lateral axis 9.

The arm 11 includes a lower extremity 20 and an upper extremity (reference sign 21 in FIG. 2) on the lateral axis 9, which link it in this case to a structure, for example a metal structure 23. This lower extremity 20 and upper extremity are also linked level with the distal extremities 19 of the first and second side branches 13, 14 to the lower side 7 and upper side 6 of the framework 2 respectively.

The structure 23 is also rectangular so that it is attached to the upper side 6, to the lower side 7, to the left side and to the right side 8 of the framework 2, as well as to the arm 11.

At the lower extremity 20 of the arm 11, the lower side 7 is interrupted along with the structure 23 such that the three branches 12 of the arm 11 form a "U"-shaped opening level with this lower extremity 20. This "U"-shaped opening enables the actuator 4 to be inserted inside a volume delimited by the branches 12 of the arm 11.

The distal extremities 19 of the first side branch 13 and the second side branch 14 have lugs 16 with holes 17. These holes 17 are intended to receive the hinge pins of the ventilation flaps (not shown) which are intended to enable the passage of an external airflow when in open position and to prevent the same airflow when in closed position.

Each hole 17 has a matching notch 18 made either in the right side 8 or in the left side of the framework 2. This makes it possible to position the flaps between the second side branch 14 and the right side 8, i.e. in the right window 50, and the flaps between the first side branch 13 and the left side of the framework 2, i.e. in the left window 51. The flaps are then held on one side by the holes 17 of the lugs 16 of the first side branch 13 or of the second side branch 14 and on the other side by the notches 18 of the right side 8 or of the left side of the framework 2.

The body 24 of the arm 11 also includes a wall 35 extending in a plane perpendicular to the longitudinal axis 10. The wall 35 is therefore parallel to the first and second side branches 13, 14. This may be either a wall distinct from said side branches or a material overthickness of one of them, in this case the second side branch 14.

In the right window 50 and the left window 51, i.e. the zones intended to receive the flaps, stops 22 that can come into contact with the ventilation flaps when these are in closed position are placed level with the upper side 6 and lower side 7 of the framework 2.

Figure 2:
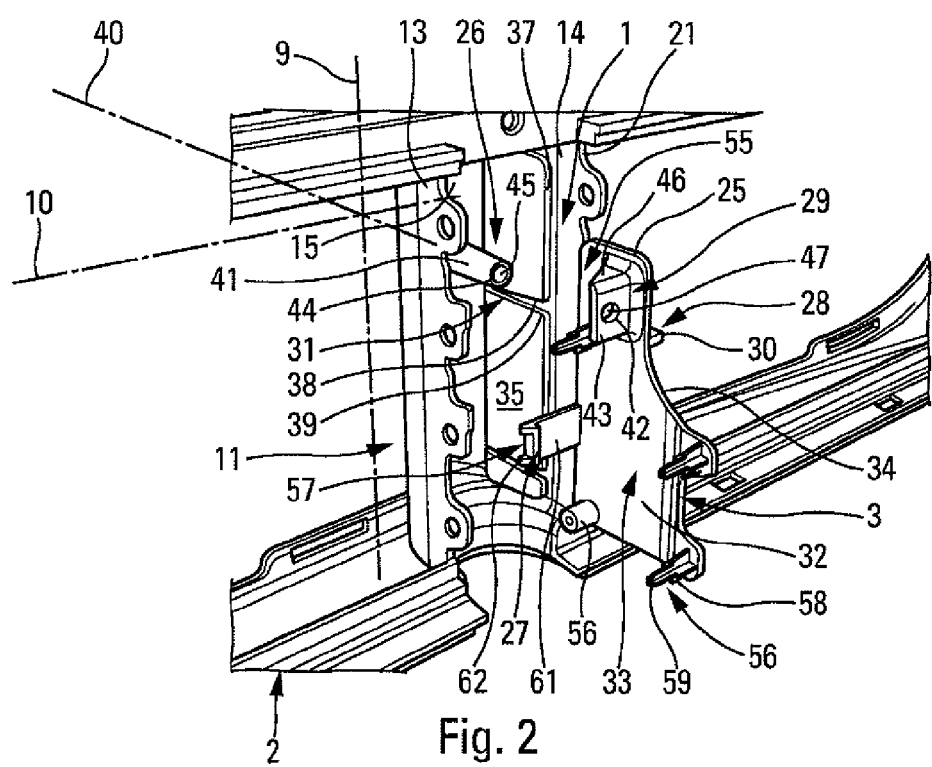
FIG. 2 is a partial perspective exploded view of the example in FIG. 1, without the actuator.

FIG. 2 shows the bracket 3. Such a bracket 3 is in the form of a plate 25 extending in a plane perpendicular to the longitudinal axis 10. Said plate 25 includes a first face 32 having a receiving zone 33 for the actuator 4 and a second face 34 opposite the first face 32. The first face 32 is then able to receive the actuator 4 in the receiving zone 33 thereof and faces the first side branch 13, while the second face 34, opposite the first face 32, faces the second side branch 14.

According to the invention, the assembly 1 includes positioning means 26 of the bracket 3 on the framework 2 and the bracket 3 includes rigid-attachment means 27 intended to hold the actuator. The assembly 1 may in particular include the actuator.

FIG. 2 also shows in greater detail the positioning means 26 and the rigid-attachment means 27 according to the invention, as well as the zones of the assembly 1 on which they are located.

Indeed, the positioning means 26 for example include pre-positioning means 28 and attachment means 29. These pre-positioning means 28 include in particular at least one rib 30 and at least one slot 31.

In the example embodiment shown in FIG. 2, the assembly 1 includes two ribs 30 located on the bracket 3 (only one being visible) and two slots 31 located on the framework 2.

The ribs 30 are located on the second face 34 of the bracket 3, i.e. they originate from the second face 34 of the bracket 3 and project therefrom. The ribs 30 extend in a plane perpendicular to the lateral axis 9.

The slots 31 are located on the wall 35 of the framework 2. The slots 31 are notches made in the wall 35 that extend in a direction parallel to a first axis 40 perpendicular to the lateral axis 9 and the longitudinal axis 10. The slots 31 are edged in the direction in which they extend by an upper edge 38 and a lower edge 39. The slots 31 are in particular flared, i.e. the distance between the upper edge 38 and the lower edge 39 decreases between the distal extremity 37 of the wall 35 and a base of said slot 31.

The slots 31 and the ribs 30 are complementary such that the ribs 30 enter the slots 31 until the reduction in the distance between the upper edge 38 and the lower edge 39 of the slots 31 prevents the ribs 30 from being inserted any further. The slots 31 and the ribs 30 thus help to position the bracket 3 on the framework 2 and in particular to pre-position the bracket 3 on the framework 2.

The attachment means 29 include a pin 41 and an eyelet 42 facing one another, the first being located on the bracket 3 and the second on the framework 2.

The pin 41 is cylindrical and originates from the central branch 15 of the arm 11 of the framework 2. The pin 41 projects from the central branch 15 and extends in a direction parallel to the first axis 40, i.e. parallel to the first and second side branches 13, 14 of the arm 11. The pin 41 is therefore located between the first side branch 13 and the second side branch 14 and in particular between the first side branch 13 and the wall 35 of the arm 11. The pin 41 has a distal extremity 44 in contact with the eyelet 42 when the assembly 1 is assembled. The pin 41 also has a hole 45 able to receive an attachment element, in particular a screw (not shown).

The eyelet 42 originates from the first face of the bracket 3 and projects therefrom. It originates in particular from an attachment zone 55 distinct from the receiving zone 33 for the actuator so as not to impede the rigid attachment of the actuator 4 to the bracket 3. The eyelet 42 has a large face 43 extending in a plane perpendicular to the first axis 40 and two braces 46 extending in planes perpendicular to the lateral axis 9 to enhance the stress resistance of the eyelet 42. The large face 43 of the eyelet 42 has a hole 47 able to receive the attachment element, in particular the screw. Once the assembly 1 has been assembled, the large face 43 of the eyelet 42 is in contact with the distal extremity 44 of the pin 41 such that the hole 47 of the eyelet 42 is aligned with the hole 45 of the pin 41 such as to enable the insertion of the attachment element. The eyelet 42 and the pin 41 thereby position the bracket 3 on the framework 2 and in particular attach the bracket 3 to the framework 2.

Once the assembly 1 has been assembled, the plate 25 of the bracket 3 is located between the wall 35 of the framework 2 and the pin 41, the second face 34 of the bracket 3 being in contact with the wall 35 of the framework 2, the ribs 30 cooperating with the slots 31 and the eyelet 42 cooperating with the pin 41. The bracket 3 therefore has at least one anchoring point represented by the cooperation of the pin 41 and of the eyelet 42 and a second anchoring point represented by the cooperation between one of the ribs 30 and one of the slots 31. The first and the second anchoring points of the bracket 3 on the framework 2 are located on either side of the receiving zone 33 for the actuator 4 such as to prevent the bracket 3 being cantilevered on the framework 2.

The rigid-attachment means 27 of the bracket 3 include at least one lug 56, in particular four lugs 56 and at least one peg 57. The four lugs 56 and the peg 57 are located on the first face 32 of the bracket 3, in particular level with the receiving zone 33 of the bracket 3. The four lugs 56 and the peg 57 project from the first face 32 of the bracket 3 and extend in a direction parallel to the longitudinal axis 10. The four lugs 56 and the peg 57 are located on a periphery of the receiving zone 33 such that the actuator can be positioned against the receiving zone 33 within the four lugs 56 and the peg 57. The peg 57 is in particular located between two of the four lugs 56 on the side of the receiving zone 33 oriented towards the central branch 15.

Three of the four lugs 56 are cross-shaped along a section in a plane perpendicular to the longitudinal axis 10, and the last lug is cylindrical. The dimensions of a first section 58 and a second section 59 of the three cross-shaped lugs 56 in a plane perpendicular to the longitudinal axis 10 are different. The first section 58, located nearer to the receiving zone 33, is larger than the second section 59 located at the distal extremity of the three cross-shaped lugs 56. A stop is therefore created at the junction between the first and second sections 58, 59.

The peg 57 includes a flat portion 61 extending in a plane perpendicular to the first axis 40 and ending in a tooth 62.

It should be noted that the framework 2 and all of the elements described above that make up the framework 2 are made unitarily, i.e. they are made simultaneously from the same material to form a single part. Similarly, the bracket 3 and all of the elements described above that make up the bracket 3 are made unitarily, i.e. they are made simultaneously from the same material to form a single part.

FIG. 1 shows the actuator 4 and how the four lugs 56 and the peg 57 enable the rigid attachment of the actuator 4 to the bracket 3.

The actuator 4 includes a housing 65 surrounding a motor (not shown), for example a direct-current motor or a step motor. The motor is able to actuate the ventilation flaps by means of a shaft (not shown) extending in a direction parallel to the longitudinal axis 10 and passing through the housing 65 via a cylindrical hole 66, crossing from one side of the housing 65 to the other and having a gear system 75. By means of this hole 66 and in particular the gear system 75, the motor is able to transmit a rotational movement to the shaft, which in turn rotates the flaps from an open position to a closed position, or vice versa.

Four flanges 67 having holes 68 receiving the four lugs 56 of the bracket 3 are arranged around a periphery of the actuator 4. Three of the four flanges 67 thus receive the three cross-shaped lugs 56 using the holes 68 therein and one flange 67 receives the cylindrical lug 56 using the hole 68 therein. The three flanges 67 receiving the three cross-shaped lugs 56 are then placed on these lugs 56 until they come into contact with the stop 60. When the flanges 67 are in this position, a first side 69 of the housing 65 of the actuator 4 is in contact with the first face 32 of the bracket 3 and in particular in contact with the receiving zone 33. Furthermore, the flat portion of the peg 57 is in contact with a second side 70 of the actuator 4, perpendicular to the first side 69 of the actuator 4 and the tooth of the peg 57 blocks the actuator 4 on a third side 71 of the actuator 4 perpendicular to the second side 70 and opposite the first side 69 in relation to the housing 65.

The invention claimed is:

1. An assembly comprising a framework for the front face of a motor vehicle, and a bracket, wherein the assembly includes means for positioning the bracket on the framework and wherein the bracket includes rigid-attachment means to hold an actuator able to drive one or more members to be mounted on the framework;
  wherein the positioning means include pre-positioning means and attachment means.

2. The assembly according to claim 1, wherein the pre-positioning means include at least one rib and at least one slot.

3. The assembly according to claim 2, wherein the rib or ribs are located on the bracket and the slot or slots are located on the framework.

4. The assembly according to claim 2, wherein the attachment means include a pin and an eyelet, placed opposite one another, one being located on the bracket and the other on the framework, the pin and the eyelet being able to receive an attachment element.

5. The assembly according to claim 4, wherein the pin is located on the framework and the eyelet is located on the bracket.

6. The assembly according to claim 4, wherein the framework includes an arm with a "U"-shaped body, the slots being located on a wall of the body, the pin originating from a central branch of the body.

7. The assembly according to claim 1, wherein the bracket has a first face with a receiving zone for the actuator.

8. The assembly according to claim 7, including an eyelet for positioning the bracket on the framework wherein the eyelet originates from the first face of the bracket, the eyelet projecting beyond the first face of the bracket.

9. The assembly according to claim 7, wherein the rigid-attachment means of the bracket include at least one lug and at least one peg, the lug or lugs and the peg or pegs projecting from the first face of the bracket in the receiving zone for the actuator.

10. The assembly according to claim 7, including ribs for positioning the bracket on the framework, the bracket having a second face opposite the first face, the rib or ribs originating from the second face and projecting therefrom.

11. The assembly according to claim 7, wherein the bracket has at least two anchoring points on the framework located on either side of the receiving zone for the actuator.

12. The assembly according to claim 1, including the actuator.

* * * * *